(12) United States Patent
Pezzutto et al.

(10) Patent No.: US 12,447,526 B2
(45) Date of Patent: Oct. 21, 2025

(54) CONTINUOUS CASTING PLANT AND CORRESPONDING REGULATION METHOD

(71) Applicants: Danieli & C. Officine Meccaniche S.P.A., Buttrio (IT); DANIELI AUTOMATION S.P.A., Buttrio (IT)

(72) Inventors: Cristiano Pezzutto, Chiarano (IT); Riccardo Conte, Ronchi Dei Legionari (IT); Gianpiero Brunetti, Ronchi Dei Legionari (IT); Andrea Carboni, Milan (IT)

(73) Assignees: Danieli & C. Officine Meccaniche S.P.A., Buttrio (IT); DANIELI AUTOMATION S.P.A., Buttrio (IT)

( * ) Notice: Subject to any disclaimer, the term of this patent is extended or adjusted under 35 U.S.C. 154(b) by 1 day.

(21) Appl. No.: 18/702,471

(22) PCT Filed: Oct. 18, 2022

(86) PCT No.: PCT/IT2022/050277
§ 371 (c)(1),
(2) Date: Apr. 18, 2024

(87) PCT Pub. No.: WO2023/067636
PCT Pub. Date: Apr. 27, 2023

(65) Prior Publication Data
US 2024/0416411 A1    Dec. 19, 2024

(30) Foreign Application Priority Data
Oct. 19, 2021   (IT) .................. 102021000026834

(51) Int. Cl.
*B22D 11/18*   (2006.01)
*B22D 11/10*   (2006.01)
*G05D 9/12*    (2006.01)

(52) U.S. Cl.
CPC ............ *B22D 11/181* (2013.01); *B22D 11/10* (2013.01); *G05D 9/12* (2013.01)

(58) Field of Classification Search
CPC ....... B22D 11/10; B22D 11/181; B22D 11/16; B22D 11/18; B22D 11/185; B22D 11/20; B22D 11/201; B22D 11/204
See application file for complete search history.

(56) References Cited

U.S. PATENT DOCUMENTS

2014/0262119 A1* 9/2014 Wagstaff ................ B22D 21/04
164/155.2

FOREIGN PATENT DOCUMENTS

| JP | 05329606 A | 12/1993 |
| JP | 2000322106 A | 11/2000 |

OTHER PUBLICATIONS

Jolly, et al., Generamed Predictive Control with Dynamic Filtering for Process Control Applications, pp. 1741-1745.
(Continued)

*Primary Examiner* — Keith Walker
*Assistant Examiner* — Steven S Ha
(74) *Attorney, Agent, or Firm* — Rankin, Hill & Clark LLP

(57) ABSTRACT

Plant (10) for the continuous casting of metal products comprising a mould (12) in which a metal (L) in the molten state is able to be poured with a determinate flow rate (Q), a regulation device (16) capable of regulating said flow rate (Q), a control unit (18) configured to manage at least the movements of said regulation device (16), and at least one detection device (19) capable of detecting every punctual variation of the level (14) of metal (L) in said mould (12) with respect to a nominal value thereof and generating a corresponding variation signal (SV) and sending it said control unit (18), which is capable of generating a command (Continued)

signal (RS) for said regulation device (16) in order to cause a desired variation of the flow rate (Q). The present invention also concerns the regulation method for generating the above command signal (RS).

10 Claims, 2 Drawing Sheets

(56) References Cited

OTHER PUBLICATIONS

Manayathara, et al., Rejection of Unknown Periodic Load Disturbances in Continuous Steel Casting Process Using Learning Repetitive Control Approach, (1996) vol. 4, No. 3, pp. 259-265.
Yanmin, et al., The Variable Selection for the Level Control of Continuous Casting Mould Based on the BP Neural Network, p. 505-509.
International Search Report and Written Opinion of PCT/IT2022/050277 dated Dec. 24, 2022, 12 pages.

\* cited by examiner

CONTINUOUS CASTING PLANT AND CORRESPONDING REGULATION METHOD

FIELD OF THE INVENTION

The present invention concerns a continuous casting plant and a regulation method to optimize the operation of the plant, in particular to regulate the flow rate of the metal in its molten state in a mould in order to maintain a substantially stable level of the metal in the latter, the fluctuation of which would have direct negative consequences on the quality of the cast product.

BACKGROUND OF THE INVENTION

It is known that in the continuous casting of metal products, for example in the form of slabs or blooms, keeping the level of the molten metal in the mould stable at a certain design value is fundamental for achieving both a constant and possibly uninterrupted casting speed, and also a high quality of the cast product. Normally an attempt is made to achieve this by regulating the flow, that is, the flow rate, of the metal in the molten state coming from a tundish and which is introduced into the mould, for example by regulating a nozzle, also known to persons of skill in the art by the acronym SEN (Submerged Entry Nozzle), which is partly immersed in the liquid bath of the mould.

The flow is normally regulated by means of a regulation device, generally a stop rod, also called buffer rod, or a gate valve, the actuation of which is managed by a control unit to increase or decrease the flow rate of metal in the molten state into the mould.

The regulation of the flow of metal is necessary because, during casting, any anomaly or disturbance can cause the level of the molten metal in the mould to vary. Examples of disturbances, but without being limited to these, can be the following: metal and non-metal agglomerates accumulated on the internal walls of the nozzle which suddenly detach; variations in the casting speed; the generation of dynamic bulging along the roller way disposed immediately downstream of the mould, due to internal pressures in the cast product. Above all, but not only, the generation of dynamic bulges, also known by the term "bulging", immediately downstream of the mould, can cause periodic fluctuations in the level of the molten metal in the mould itself, known by the acronym MLF (Mould Level Fluctuations). For the sake of brevity, in the remainder of this description, the term "disturbance" means all of the disturbances described above.

Currently it is not possible to compensate MLFs that have high frequencies, for example higher than 0.5 Hz, by acting on the flow rate of the liquid metal entering the mould. This fact is particularly critical in the case of a continuous casting of flat products, for example thin slabs, that is, with a thickness comprised between about 45 mm and about 150 mm, and in the casting technology associated directly with a rolling line, that is, of the so-called endless type, because as the casting speed increases, especially above about 4 m/min, the risk of having high frequency MLFs increases, and these are much more difficult to control.

The control apparatuses currently in use, understood as sets of hardware and software, are configured to control the regulation device in a closed loop or in an open loop. In the first case, the control apparatus receives an input signal containing an actual measurement of the level of molten metal in the mould, it compares this actual measurement with a reference design value, it calculates the error and sends an actuation signal to the flow regulation device. In the second case, however, there is no direct measurement of the level to be controlled and a control signal is generated for the regulation device of the nozzle, based on the characteristics of the specific continuous casting plant as a whole and on the detection of the disturbances acting on it, which is carried out by suitable detection means.

In particular, a control apparatus is known, designed by the present Applicant and marketed under the name "Q-level+", which is configured to compensate the MLFs by sending a forward control signal, also called feedforward, to command the position of the regulation device of the nozzle so as to obtain an oscillating flow rate in the mould having the same frequency, but a certain fixed phase opposite to the signal that characterizes the disturbance, as defined above.

However, it has been found that, for MLFs with high frequencies, that is, greater than about 0.5 Hz, the actual variation of the flow rate of molten metal in the mould, in response to the movement of the flow regulation device, occurs with a certain overall delay with respect to the generation of the forward control signal; this overall delay, in the order of some tenths of a second, is due both to the delay of the signal coming from a sensor that measures the actual level of the molten metal in the mould, and also to the inertia of the device to regulate the flow rate, and also to other phenomena that are difficult to detect, such as for example the non-linearity of the plant. This overall delay prevents the control unit from optimally compensating the MLFs, because the time scale of the disturbance is comparable or in any case of the same order of magnitude as that of the overall delay. In fact, when the frequency of the MLFs increases, the overall delay interferes with the time scale of the phenomenon and the phase of the feedforward signal is altered, since it is not possible to reduce the MLFs that begin to increase rather than decrease, which requires a sudden reduction in the casting speed, with a consequent negative impact on the productivity of the plant.

Document JP 2000 322106 A describes a method for regulating the level of molten metal in the mould by varying the flow rate of metal supplied through a nozzle. The method provides to estimate a periodic disturbance signal that causes metal fluctuations in the mould and to use said estimate directly in the loop that generates the control signal that determines the functioning of the nozzle. One disadvantage of this method is that, since the control signal is based directly on the estimate of the disturbance signal, it is not possible to completely compensate the disturbance itself.

There is therefore a need to perfect a method for regulating a continuous casting plant, in particular for regulating a flow rate of metal in the molten state introduced into a mould, which can overcome at least one of the disadvantages of the state of the art.

In particular, one purpose of the present invention, which coincides with the technical problem that the Applicant intends to resolve, is to perfect a continuous casting plant and a method for regulating the plant, which are able to reduce as much as possible the reaction time of the plant with respect to the disturbances that can cause an excessive variation, beyond certain threshold values, of the level of the metal in the molten state in the mould with respect to a determinate nominal value, also and especially for disturbance frequencies higher than 0.2 Hz.

Another purpose of the present invention is to provide a plant and to develop a method for regulating the plant which allows the continuous casting speed to be kept almost constant, also and especially for speeds higher than 4 m/min.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the invention or variants to the main inventive idea.

In accordance with the above purposes, and to resolve the technical problem disclosed above in a new and original way, also achieving considerable advantages compared to the state of the prior art, a plant for the continuous casting of metal products, according to the present invention, comprises a mould in which a metal in the molten state is able to be poured with a determinate flow rate, a regulation device capable of regulating the flow rate, a control unit configured to manage at least the movements of the regulation device, and at least one detection device capable of detecting every punctual variation of the level of the metal in the mould with respect to a nominal value thereof and generating a corresponding variation signal and sending it to the control unit.

In accordance with one aspect of the present invention, the control unit comprises a central processing unit and at least one memory unit connected to it in which at least one first compensation algorithm is stored which, without using any measurement or estimate of a disturbance acting on the plant, is able to allow the central processing unit to selectively generate a command signal for the regulation device starting from the variation signal and taking into account the overall delay between the generation of the variation signal and the actual actuation of the regulation device, the command signal having at least a variable amplitude of its own and a variable phase of its own.

Doing so achieves the surprising advantage that the delay in the variations/compensations of the flow rate of the metal in the molten state introduced into the mould, which are determined by the movement of the regulation device, which is felt in traditional plants and methods, is completely or at least partly compensated, thus allowing to effectively reduce the MLFs, even with frequencies higher than, or in the neighborhood of, about 0.2 Hz. In this way, it is possible to advantageously guarantee a high and constant casting speed, ensuring uninterrupted productivity, with considerable advantages both economic and also of improved quality of the cast product.

In accordance with another aspect of the present invention, a regulation method for a plant for the continuous casting of metal products, which is provided with a mould to contain metal in the molten state, regulation means to regulate the flow rate of the metal and keep the level thereof in the mould stable, and a control unit connected to the regulation means, comprises a detection step in which detection means detect a punctual variation of said level with respect to a nominal value and generate a corresponding variation signal, having a frequency, amplitude and phase of its own, which is sent to the control unit.

In accordance with another aspect of the present invention, the method also comprises a control step, in which the control unit, in response to the variation signal and in accordance with at least one first compensation algorithm, selectively generates, without using any measurement or estimate of a disturbance acting on the plant, a command signal for the regulation device starting from the variation signal and taking into account the overall delay between the generation of the variation signal and the actual actuation of the regulation device, the control signal having at least a variable amplitude of its own and a variable phase of its own.

In accordance with another aspect of the present invention, the control step comprises a calculation sub-step in which the control unit, before calculating the command signal, processes the variation signal and generates, in an iterative manner and instant by instant, a control signal having an amplitude and phase of its own, which acts as a basis for the generation of the command signal, together with a correction value generated on the basis of the first compensation algorithm which takes into account a mathematical system associated with the overall delay.

In accordance with another aspect of the present invention, the mathematical system is considered in the frequency domain and associates a transfer function having a gain, which takes into account an amplitude distortion, and a phase, which takes into account the overall delay as defined above, the control signal being an input signal of the mathematical system and the command signal being an output signal from the mathematical system, expressed by the relation $RS=A_r\text{sen}(\omega t+\varphi_r)=A_cA_s\text{sen}(\omega t+\varphi+\varphi_s)$.

In accordance with another aspect of the present invention, during the calculation sub-step the control unit, by means of the at least one first compensation algorithm, calculates first an error function defined by the difference between the variation signal and the command signal and expressed as $E=A_cA_s\text{sen}(\omega t+\varphi+\varphi_s)+A_d\text{sen}(\omega t+\varphi_d)$, and subsequently a cost function proportional to the square of the error function as above, wherein the cost function is optimized to find the optimal values of amplitude and phase of the control signal.

In accordance with another aspect of the present invention, during the calculation sub-step, the cost function is optimized on the basis of optimization algorithms selected from a gradient descent algorithm, or an algorithm based on the estimation of the moments of the gradient, and it is possibly combined with an error back-propagation algorithm.

In accordance with another aspect of the present invention, the at least one first compensation algorithm is configured to also compensate the frequency of the control signal in the event that the initial estimate of the frequency of the variation signal is incorrect.

In accordance with another aspect of the present invention, the at least one first compensation algorithm generates the control signal only if the variation signal has a frequency greater than or around 0.2 Hz.

In accordance with another aspect of the present invention, the at least one first compensation algorithm is implemented with a neural network artificial intelligence having an input layer containing information relating to the frequency of the control signal, a hidden layer containing the functions of activation of the oscillatory phenomenon of the variation signal, that is, sine and cosine, weighted with the orthogonal components of the control signal, and an output layer which is a linear combination of the control signal.

DESCRIPTION OF THE DRAWINGS

These and other aspects, characteristics and advantages of the present invention will become apparent from the following description of an embodiments, given as a non-restrictive example with reference to the attached drawings wherein.

Figure 1:
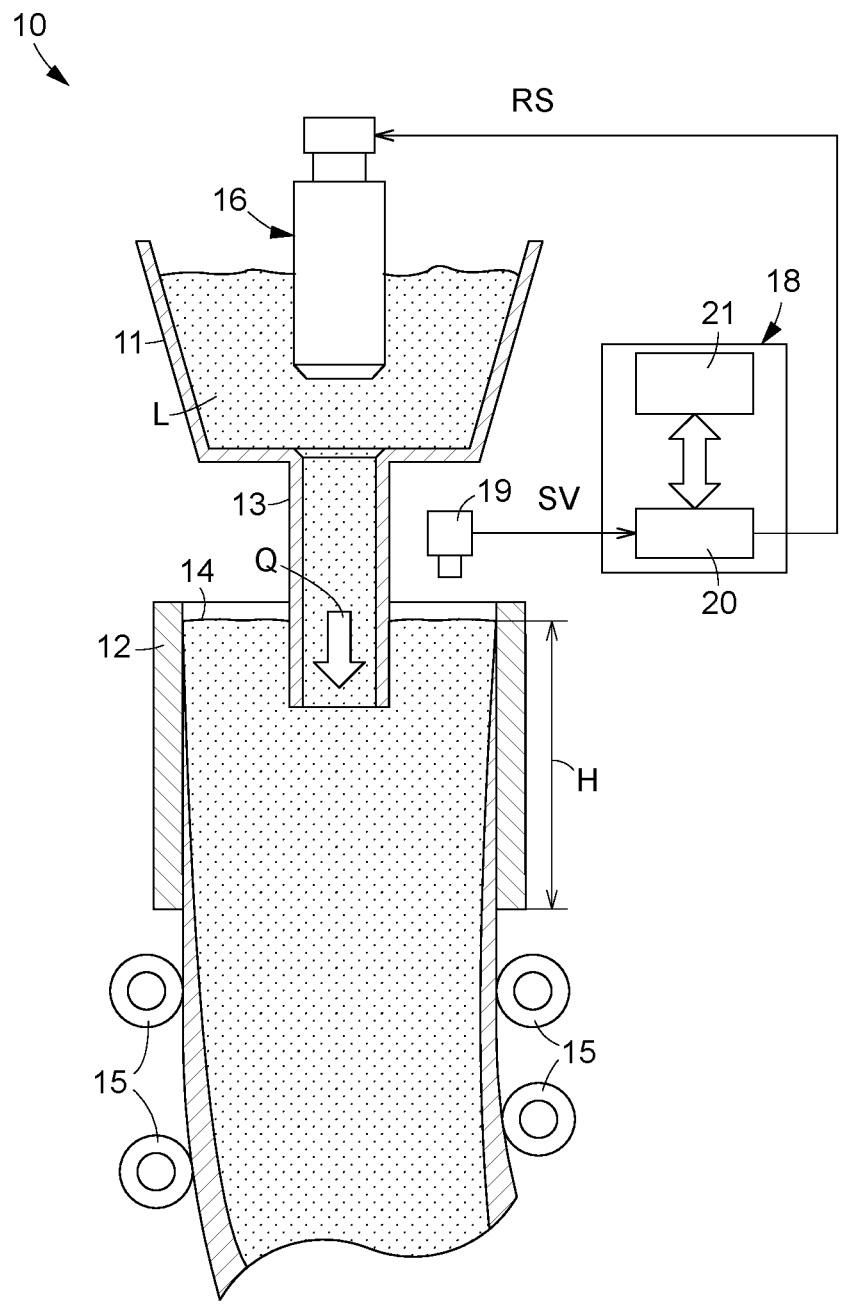
FIG. 1 is a schematic section view of a part of a continuous casting plant according to the present invention.

We must clarify that in the present description the phraseology and terminology used, as well as the figures in the attached drawings also as described, have the sole function of better illustrating and explaining the present invention, their function being to provide a non-limiting example of the invention itself, since the scope of protection is defined by the claims.

To facilitate comprehension, the same reference numbers have been used, where possible, to identify identical common elements in the drawings. It is understood that elements and characteristics of one embodiment can be conveniently combined or incorporated into other embodiments without further clarifications.

DESCRIPTION OF AN EMBODIMENT OF THE PRESENT INVENTION

With reference to FIG. 1, a plant 10 for the continuous casting of metal products, according to the present invention, comprises in sequence and from top to bottom: a tundish 11 configured to contain a determinate quantity of metal L in the molten state, possibly coming from a ladle, not shown in the drawings; a mould 12 into which the metal L is able to be poured with a determinate flow rate Q by means of a nozzle 13 of a known type, for example a submerged entry nozzle (SEN), so that a level 14, or meniscus, of the metal L is formed at a determinate distance H from the base of the mould 12, for example; and a plurality of pairs of rollers 15 disposed along a determinate path to effect a gradual solidification (soft reduction) of the cast product.

Associated with the tundish 11 is a regulation device 16 of a known type, which can comprise a vertically mobile rod for example, capable of regulating, for example by moving vertically, the flow rate Q of the metal L, so that the level 14 of the latter in the mould 12 is as constant and stable as possible, despite the various disturbances of the plant 10 due to multiple causes, such as, for example, and without limitations to generality: solid agglomerates accumulated on the internal walls of the nozzle 13 which can suddenly detach and pollute the metal L; variations in the casting speed S; generation of dynamic bulges along the pairs of rollers 15 disposed at the foot, or immediately downstream, of the mould 12, caused by the pressures present in the cast product not yet completely solidified.

In particular, the dynamic bulges as above can cause the MLFs mentioned above, that is, periodic fluctuations of the level 14 with respect to a nominal value defined in the design of the plant 10 on the basis of other casting parameters, such as for example the casting speed S expressed in meters per minute, and fluctuations of the level 14, which can be as much as ten millimeters.

The plant 10 also comprises both a control unit 18 configured to manage, according to certain criteria which will be described below, at least the movements of the regulation device 16, and also at least one detection device 19 capable of detecting every punctual variation of the level 14 with respect to the nominal value as above, that is, that which would occur in the absence of said disturbances of the plant 10 as a whole, and generating a corresponding variation signal SV which is sent to the control unit 18. In other words, the variation signal SV is equivalent to the actual variation of the level 14, and it is correlated in some way to an indirect measurement of the disturbances of the plant 10. We must clarify that the variation signal SV is not equivalent to a disturbance signal.

The control unit 18 comprises a central processing unit, or CPU, 20 and at least one memory unit 21 connected thereto, in which at least one compensation algorithm ALG1 is stored which is capable of making the same CPU 20 generate, in response to the variation signal SV, a command signal RS for the regulation device 16.

In particular, before generating the command signal RS, the control unit 18 generates a control signal CS on the basis of the compensation algorithm ALG1, which also takes into account the overall delay RC that can occur between the detection of the level 14, the generation of the variation signal SV and the actual actuation of the regulation device 16, due to various phenomena, including non-measurable ones. This overall delay RC may be due, for example, but not only, to the inertia of the masses of the regulation device 16 when they are set in motion.

The command signal RS, instead of being sent directly to the regulation device 16, can be combined, for example, with a main control signal—also known as set-point signal—which is capable of controlling the position of the regulation device 16 in a standard condition in which there is no plant 10 disturbance.

The present invention provides that the command signal RS is generated in advance (feedforward), once it has been established that the variation signal SV exceeds a certain critical threshold, as will be explained below.

The regulation device 16, following the command signal RS, is moved according to a movement profile capable of compensating the actual variations of the level 14, both in terms of amplitude and also in terms of phase, also compensating the overall delay RC. The command signal RS can be capable of compensating the variation signal SV also in terms of frequency, for example in the case in which the frequency of the variation signal SV deviates from a "real" frequency that characterizes the disturbance of the plant 10. In particular, the command signal RS generated by the control unit 18 is added to the main control signal to adjust the frequency, the phase or the amplitude of the movement profile of the regulation device 16 in order to minimize the disturbance of the plant 10. The variation signal SV has a substantially oscillating trend and can be represented as a sinusoid with amplitude $A_d$, phase $\varphi_d$, frequency $f_d$. In mathematical terms, the variation signal SV can be written in the following form: $A_d \mathrm{sen}(\omega t + \varphi_d)$, where $\omega = 2\pi f_d$ is the pulsation. Since the variation signal SV can be characterized by a band of frequencies, the control unit 18, or the detection device 19 itself, can determine a main frequency $f_d$ intended as the frequency, or one of the frequencies, which characterize the oscillatory phenomenon of the disturbance of the plant 10 in a prevalent manner.

The control signal CS generated therefore also has an oscillating trend and can be represented as a sinusoid with amplitude $A_c$, phase $\varphi_c$, frequency $f_c$, where the frequency fc of the control signal CS is equal to the frequency $f_d$ of the variation signal SV. In mathematical terms, the control signal CS can be written in the form: $A_c \text{sen}(\omega t + \varphi_c)$.

Similarly, the command signal RS can be represented as a sinusoid with amplitude $A_r$, phase $\varphi_r$, frequency $f_r$, where the frequency $f_r$ of the command signal RS is equal to the frequency $f_d$ of the variation signal SV.

The operation of the plant 10, which corresponds to the regulation method, according to the present invention, provides to regulate the flow rate Q of the metal L in order to keep the level 14 in the mould 12 substantially stable.

In particular, the method comprises a detection step in which the detection device 19 detects a punctual variation of the level 14 with respect to a nominal value and generates a corresponding variation signal SV, having a frequency $f_d$, an amplitude $A_d$ and a phase $\varphi_d$, which is sent to the control unit 18.

The method can also comprise a step of "observing" the disturbance acting on the plant 10. The disturbance observation step has the sole purpose of defining when/if it is necessary to generate the command signal RS to be combined with the main control signal. Contrary to the state of the art, the present invention does not provide any estimate of a disturbance signal to be used in the control loop for its reduction. In other words, observing the disturbance is not required for the purposes of the compensation, but only to understand whether to compensate or not. The method also comprises a control step, in which the control unit 18, in response to the variation signal SV and in accordance with the at least one first algorithm ALG1, selectively generates a command signal RS for the regulation device 16 starting from the variation signal SV and taking into account the overall delay RC between the generation of the variation signal SV and the actual actuation of the regulation device 16. The command signal RS has at least a variable amplitude $A_r$ of its own and a variable phase $\varphi_r$ of its own.

In particular, the command signal RS has, instant by instant, its own amplitude $A_r$ equal to the amplitude $A_d$ of the variation signal SV and its own phase $\varphi_r$ opposite to the phase $\varphi_d$ of the variation signal SV.

The command signal RS thus generated allows to drastically reduce the response delay that occurs between the measurement of the variation signal SV and the actual variation of flow rate Q of metal L obtained with the movement of the regulation device 16.

The control step comprises a calculation sub-step in which the control unit 18, before calculating the command signal RS, processes the variation signal SV and generates, in an iterative manner and instant by instant, the control signal CS having an amplitude $A_c$ and phase c, of its own, which serves as the basis for the generation of the command signal RS, together with a correction value generated on the basis of the first compensation algorithm ALG1 which takes into account a mathematical system associated with the overall delay RC.

The above mathematical system is considered in the frequency domain and associates a transfer function having a gain $G_s$, which is a function of $A_s$ and takes into account an amplitude distortion, and a phase $\varphi_s$ which takes into account the overall delay RC and which, with the present method, we intend to identify in order to achieve high control performances.

In this specific case, the control signal CS is an input signal to the mathematical system while the command signal RS is an output signal of the mathematical system and can be expressed in the form $RS = A_r \text{sen}(\omega t + \varphi_r) = A_c A_s \text{sen}(\omega t + \varphi + \varphi_s)$.

The mathematical system as above can represent, for example, all the functional components/objects comprised between the detection of the variation in level 14 and the actual variation of flow rate Q of metal L in the mould 12 in a limited and well-defined portion of the spectrum.

The command signal RS can be expressed with respect to the variation signal SV as $RS = A_c A_s \text{sen}(\omega t + \varphi_c + \varphi_s) = -A_d \text{sen}(\omega t + \varphi_d)$.

The at least one first compensation algorithm ALG1 is configured to solve the equivalence $A_c A_s \text{sen}(\omega t + \varphi_c + \varphi_s) = -A_d \text{sen}(\omega t + \varphi_d)$ in order to obtain the amplitude $A_c$ and the phase $\varphi_c$ of the control signal CS. The control unit 18, by means of the at least one first compensation algorithm ALG1, calculates first an error function E defined by the difference between the variation signal SV and the command signal RS and expressed as $E = A_c A_s \text{sen}(\omega t + \varphi_c + \varphi_s) + A_d \text{sen}(\omega t + \varphi_d)$, and then, given the complexity of the error function E, it calculates a cost function J proportional to the square of the error function E which is minimized in order to find the optimal values of amplitude $A_c$ and phase $\varphi_c$ of the control signal CS.

The optimization of the cost function J can occur through any known optimization algorithm whatsoever, for example a gradient descent algorithm known as "batch gradient descent", "stochastic gradient descent", "mini-batch gradient descent", or algorithms based on the estimation of the moments of the gradient, such as NAG, AdaGrad, RMSProp, AdaDelta, AdaMax, Nadam, AMSGrad, kSGD, ADAM.

According to one possible embodiment of the method, the compensation algorithm ALG1 can also be configured to compensate the frequency f of the control signal CS in the event that the initial estimate/choice of the frequency $f_d$ is incorrect.

According to some embodiments, the first compensation algorithm ALG1 can be implemented with an artificial intelligence, for example a neural network. This neural network comprises an input layer containing information relating to the frequency fc of the control signal CS to be calculated, a hidden layer containing the functions of activation of the oscillatory phenomenon, sine and cosine, weighted with the orthogonal components $a_c$ and $b_c$ relating to the control signal CS $A_c \text{sen}(\omega t + \varphi_c)$, and an output layer which is a combination of the control signal CS.

According to some embodiments, the at least one first algorithm ALG1 generates the control signal CS only if the variation signal SV has a frequency $f_d$ greater than or around 0.2 Hz.

Otherwise, that is, for frequencies lower than about 0.2 Hz, the variation signal SV can be compensated in the traditional way, for example with the use of a second compensation algorithm ALG2, also stored in the memory unit 21 and configured to calculate the amplitude $A_c$ and the phase $\varphi_c$ of the control signal CS without iteratively considering the characteristics of the mathematical system of the plant 10. In other words, for frequencies lower than about 0.2 Hz, the second compensation algorithm ALG2 does not consider the delays and non-linearities of the plant 10, which for these frequencies typically do not affect the control of the regulation device 16.

Figure 2:
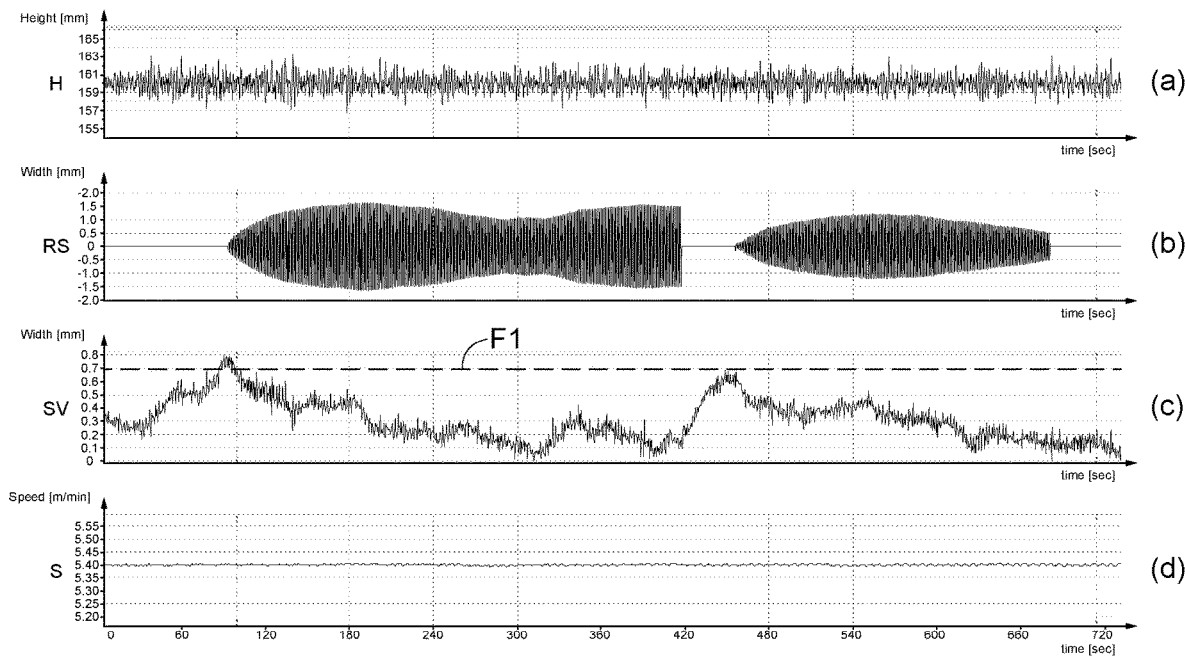
FIG. 2 shows four graphs relating to an example of operation of the plant of FIG. 1 which have the same time scale in seconds in the abscissa axis, while in the ordinate axis they have, respectively: (a) a curve that indicates the level of the metal in the molten state in a mould; (b) a curve that indicates a command signal for a device for regulating the flow rate of the metal in the molten state in the mould; (c) a curve that indicates a signal of variation of the level of the metal in the molten state in the mould; (d) the trend of the casting speed expressed in m/min.

The graphs schematically shown in FIG. 2 show an application of the method described above using the plant 10, when the variation signal SV, which corresponds to a measurement of the disturbances, has a high frequency, for example around or above approximately 1 Hz. When the variation signal SV, graph (c), indicative of variations of the level 14, which in this case is expressed in terms of amplitude, exceeds a determinate threshold value F1, the first compensation algorithm ALG1 begins to generate a control signal CS, processing it into a command signal RS, graph (b), which compensates, that is, decreases, the variation signal SV. When the variation signal SV has returned within a preestablished threshold, for example below the threshold value F1, and the control signal CS is sufficiently weak, the first compensation algorithm ALG1 stops generating the control signal CS. The process is repeated when, subsequently, the variation signal SV once again exceeds the threshold value F1. Considering the amplitude of the control signal CS in the self-shutdown logic allows to compensate the MLFs in an optimal manner and not generate possible anomalous peaks, known to persons of skill in the art as "overshoot phenomena", caused by a sudden shutdown. As can be seen from graph (d), which shows the casting speed S, the compensation of the variation signal SV occurs without there being a decrease in the casting speed S and therefore without any impact on the productivity of the plant 10.

Figure 3:
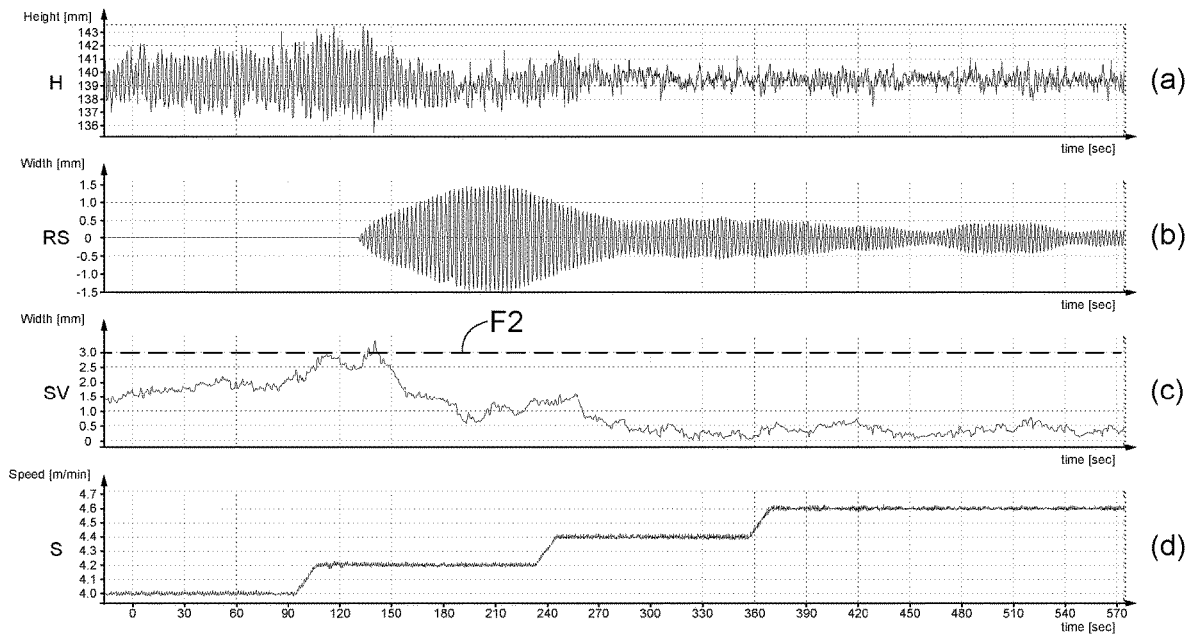
FIG. 3 shows four graphs relating to another example of operation of the plant of FIG. 1 which have the same time scale in seconds in the abscissa axis, while in the ordinate axis they have, respectively: (a) a curve that indicates the level of the metal in the molten state in a mould; (b) a curve that indicates a command signal for a device for regulating the flow rate of the metal in the molten state in the mould; (c) a curve that indicates a signal of variation of the level of the metal in the molten state in the mould; (d) the trend of the casting speed expressed in m/min.

The graphs shown schematically in FIG. 3 show another application of the method described above using the plant 10, when the variation signal SV, which corresponds to a measurement of the disturbances, has a frequency around approximately 0.5 Hz. In this case, the disturbances may be indicative of the presence of bulging. When the variation signal SV, graph (c), exceeds a determinate threshold value F2, the first compensation algorithm ALG1 starts to generate a control signal CS, processing it into a command signal RS, graph (b), which compensates, that is, decreases, the variation signal SV. In this case, the command signal RS is continuous and has an amplitude that decreases over time. As can be seen from graph (d), as the casting speed S increases, the variation signal SV is optimally compensated without needing to interrupt the process.

It is clear that modifications and/or additions of parts may be made to the plant and to the regulation method as described heretofore, without departing from the field and scope of the present invention, as defined by the claims.

It is also clear that, although the present invention has been described with reference to some specific examples, a person of skill in the art shall certainly be able to achieve many other equivalent forms of casting plant 10 and corresponding regulation method, having the characteristics as set forth in the claims and hence all coming within the field of protection defined thereby.

In the following claims, the sole purpose of the references in brackets is to facilitate their reading and they must not be considered as restrictive factors with regard to the field of protection defined by the same claims.

The invention claimed is:

1. Plant for continuous casting of metal products comprising a mould in which a metal in a molten state is able to be poured with a determinate flow rate, a regulation device capable of regulating said flow rate, a control unit configured to manage at least movements of said regulation device, and at least one detection device capable of detecting every punctual variation of a level of metal in said mould with respect to a nominal value thereof and generating a corresponding variation signal having a frequency, an amplitude and a phase and sending the corresponding variation signal to said control unit, wherein said control unit comprises a central processing unit and at least one memory unit connected to the central processing unit in which at least one first compensation algorithm is stored, wherein the at least one first compensation algorithm is configured to make said central processing unit, without using any measurement or estimate of a disturbance acting on said plant, selectively generate a command signal for said regulation device starting from said variation signal and taking into account an overall delay between the generation of said variation signal and actual actuation of said regulation device, said command signal having at least a command signal variable amplitude and a command signal variable phase.

2. Regulation method for a plant for continuous casting of metal products, having a mould to contain metal in a molten state, regulation means to regulate a flow rate of said metal and keep a level thereof stable in said mould, and a control unit connected to said regulation means, wherein said method comprises a detection step in which detection means detect a punctual variation of said level with respect to a nominal value, and generate a corresponding variation signal, having a frequency, an amplitude and a phase, which is sent to the control unit, and wherein the method further comprises a control step, in which said control unit, in response to said variation signal and in accordance with at least one first compensation algorithm, selectively generates, without using any measurement or estimate of a disturbance acting on said plant, a command signal for said regulation device starting from said variation signal and taking into account an overall delay between the generation of said variation signal and actual actuation of said regulation device, said command signal having at least a command signal variable amplitude and a command signal variable phase.

3. Method as in claim 2, wherein said control step comprises a calculation sub-step in which said control unit, before calculating said command signal, processes said variation signal and generates, in an iterative manner and instant by instant, a control signal having a control signal amplitude and a control signal phase, which serves as a basis for generation of said command signal, together with a correction value generated on the basis of said at least one first compensation algorithm which takes into account a mathematical system associated with said overall delay.

4. Method as in claim 3, wherein said mathematical system is considered in a frequency domain and associates a transfer function having a gain and a phase which takes into account said overall delay, said control signal being an input signal of said mathematical system and said command signal being an output signal from said mathematical system, expressed by $RS = A_r \text{sen}(\omega t + \varphi_r) \equiv A_c A_s \text{sen}(\omega t + \varphi + \varphi_s)$.

5. Method as in claim 4, wherein during said calculation sub-step said control unit uses said at least one first compensation algorithm first to calculate an error function defined by a difference between said variation signal and said command signal and expressed as $E = A_c A_s \text{sen}(\omega t + \varphi + \varphi_s) + A_d \text{sen}(\omega t + \varphi_d)$, and subsequently a cost function proportional to a square of said error function, wherein said cost function is optimized to find optimal values of amplitude and phase of said control signal.

6. Method as in claim 5, wherein during said calculation sub-step said cost function is optimized on the basis of optimization algorithms selected from a gradient descent algorithm, or an algorithm based on an estimation of a set of moments of a gradient.

7. Plant for continuous casting of metal products comprising:
- a mould in which a metal in a molten state is able to be poured with a determinate flow rate;
- a regulation device capable of regulating said flow rate;
- a control unit configured to manage movements of said regulation device; and
- at least one detection device capable of detecting every punctual variation of a level of metal in said mould with respect to a nominal value thereof and generating a corresponding variation signal having a frequency, an amplitude and a phase and sending the corresponding variation signal to said control unit;
- wherein said control unit comprises a central processing unit and at least one memory unit connected to the central processing unit in which at least one first compensation algorithm is stored, and
- wherein the control unit is programmed and configured to execute the regulation method of claim 2.

8. Method as in claim 3, wherein said at least one first compensation algorithm is configured to also compensate the frequency of said control signal in the event that an initial estimate of the frequency of said variation signal is wrong.

9. Method as in claim 3, wherein said at least one first compensation algorithm generates said control signal only if said variation signal has a frequency greater than or around 0.2 Hz.

10. Method as in claim 5, wherein said at least one first compensation algorithm is implemented with a neural network artificial intelligence having an input layer containing information relating to the frequency of said control signal, a hidden layer containing functions of activation of oscillatory phenomenon of said variation signal, that is, sine and cosine, weighted with orthogonal components of said control signal, and an output layer which is a linear combination of said control signal, and wherein a backpropagation algorithm of said error function is applied to said neural network for iterative estimation of the orthogonal components and relating to the control signal.

* * * * *